United States Patent [19]
Joyce, Jr. et al.

[11] Patent Number: 5,721,683
[45] Date of Patent: Feb. 24, 1998

[54] ELECTRONIC DISCRETE BRAKE CONTROL SYSTEM FOR A TRAIN

[75] Inventors: Michael J. Joyce, Jr., Jefferson Borough; Leonard Roselli, Murrysville, both of Pa.

[73] Assignee: Westinghouse Air Brake Company, Wilmerding, Pa.

[21] Appl. No.: 550,623

[22] Filed: Oct. 31, 1995

[51] Int. Cl.$^6$ ................................. G06F 7/70; B60T 8/00
[52] U.S. Cl. ........................... 364/426.01; 364/424.024; 303/25; 303/28; 340/825.03; 340/825.01
[58] Field of Search ................... 364/426.01, 426.15, 364/426.21, 426.25, 426.028, 426.32, 426.05, 424.024, 423.098; 303/20, 15, 3, 16, 7, 33, 71, 81, 86, 128, 131, 25, 28, 48; 340/146.2, 825, 825.03, 825.06, 825.22, 825.01

[56] References Cited

U.S. PATENT DOCUMENTS

| | | | |
|---|---|---|---|
| 5,172,316 | 12/1992 | Root et al. | 364/426.01 |
| 5,192,118 | 3/1993 | Balukin et al. | 303/15 |
| 5,222,788 | 6/1993 | Dimsa et al. | 303/15 |
| 5,249,125 | 9/1993 | Root et al. | 364/426.01 |
| 5,412,572 | 5/1995 | Root et al. | 364/426.01 |
| 5,415,465 | 5/1995 | Skantar et al. | 364/426.01 |
| 5,570,284 | 10/1996 | Roselli et al. | 364/426.05 |
| 5,590,042 | 12/1996 | Allen, Jr. et al. | 364/426.01 |

*Primary Examiner*—Jacques Louis-Jacques
*Attorney, Agent, or Firm*—James Ray & Associates

[57] ABSTRACT

A system for electronically controlling brakes on a train is responsive to a brake handle positionable into any one of a plurality of discrete positions. The discrete brake control system includes a cab station unit, a brake control unit, a comm channel and a direct communication device. The cab station unit generates both a base signal stream and a dedicated signal stream. The base signal stream is indicative of parameters for operating the system including the discrete brake handle positions. The dedicated signal stream is solely indicative of the discrete brake handle positions. The brake control unit controls operation of the brakes in coordinated response to both the base and the dedicated signal streams. The comm channel is the route through which the base signal stream is communicated from the cab station unit to the brake control unit. The direct communication device is in parallel with the comm channel and is the route through which the dedicated signal stream is communicated from the cab station unit to the brake control unit. Information pertaining to the discrete brake handle positions is communicated to the brake control unit faster through the direct communication device than through the comm channel. This enables the brake control unit to respond promptly to positioning of the brake handle.

8 Claims, 7 Drawing Sheets

ELECTRONIC DISCRETE BRAKE CONTROL SYSTEM FOR A TRAIN

FIELD OF THE INVENTION

The present invention generally relates to a system for electronically controlling brakes on a train consist wherein the system has a brake control unit for controlling the brakes in response to either placement of a brake handle into any of a plurality of discrete control positions or manipulation of a like device mimicking the function of the brake handle. More particularly, the present invention pertains to a communication package for directly communicating to the brake control unit signals indicative of the discrete positions into which the handle or like device is placed thereby enabling the brake control unit to respond more quickly thereto.

BACKGROUND OF THE INVENTION

A typical train consist includes at least one locomotive, one or more rail vehicles and a plurality of trainlines. The trainlines include both pneumatic and electrical lines which generally run from a head of train locomotive to a last rail vehicle in the train and connect to air brakes and electrical devices, respectively, in each of the rail vehicles. In a locomotive, the pneumatic trainlines include an actuating pipe, a main reservoir equalizing (MER) pipe, and an independent application and release (IAR) pipe. Within a locomotive consist (i.e., two or more locomotives interconnected), each of the MER, actuating and IAR pipes respectively interconnect with the MER, actuating and IAR pipes of the other locomotives. The pneumatic trainlines also include a brake pipe whose pressure mimics pressure within a storage tank called an equalization reservoir. The brake pipe consists of a series of pipe lengths one of which secured to the underside of each rail vehicle and interconnected to another such pipe length via a flexible coupler situated between each rail vehicle. Connected to the equalization reservoir, the brake pipe is thus one long continuous pipe running from the head of train locomotive to the last rail vehicle.

Sometimes referred to in the singular as a trainline or a trainline cable, the electrical trainlines (i.e., wires) generally include a power line, a ground line, and various control lines which, along with other electrical lines, are contained within a protective conduit or cable. As with the brake pipe, the electrical trainlines actually constitute a series of individual conduits one of which usually secured to the underside of each rail vehicle and interconnected via a connector situated between each rail vehicle. For the sake of clarity, the reader is advised that hereinafter all references to the term "trainline" denote "electrical trainline" and not "pneumatic trainline" unless otherwise specifically noted.

A typical locomotive has an electronic brake control system such as WABCO EPIC® Brake Equipment as shown and described in U.S. Pat. Nos. 5,192,118 and 5,222,788 and incorporated herein by reference. Such brake control systems generally include a brake control unit (BCU) for controlling operation of the brakes; a cab station unit for providing various inputs including automatic and independent brake handle positions to the brake control unit as alluded to hereinafter; a keyboard for accessing the brake equipment including providing certain set-up parameters as indicated below; a display for monitoring brake equipment operation; a locomotive interface unit (LIU) for connecting both electrical power and the trainlines to the brake equipment; and a pneumatic operating unit (POU) having solenoid valves for controlling pressures in the pneumatic trainlines and in the reservoirs so as to control the brakes according to commands received from the brake control unit.

Referring still to the elements of the typical locomotive, the cab station unit generally includes an independent brake handle, an automatic brake handle, and a cab control unit (CCU). The cab control unit has a cab CPU board and a cab input/output (I/O) card which links the handles to the cab CPU board via a base port. Depending upon the particular brake control system, the handles and the rest of the cab station unit may be configured either as part of same unit or as separate units. Through the independent brake handle, a train operator may apply and release the brakes on each locomotive. Through the automatic brake handle, however, the train operator may apply and release the brakes not only on each locomotive but also on each rail vehicle. The rate at which the brake equipment reduces or increases pressure within the brake pipe, and thus the amount of braking power exerted by the train brakes, generally corresponds to the position of the automatic brake handle.

Various brake control systems, such as several WABCO EPIC® 26 and 30 Series Brake Control Systems and like systems (hereinafter "nondiscrete brake control systems"), respond to the automatic brake handle as it is moved to any point along a continuum within which it is designed to move. From a release position at one extreme in which brake pipe pressure is maximum and the brakes are completely released to an emergency position at another extreme in which brake pipe pressure is zero and the brakes are fully applied, the brake pipe may assume any pressure level in between. The automatic brake handle may be moved to and between any of the positions described generally as follows. When the automatic brake handle is moved to the release position, the brake equipment increases pressure within the equalization reservoir and thus the brake pipe and correspondingly reduces pressure within the brake cylinders so as to release completely the train brakes. In the minimum service position, the brake equipment reduces pressure slightly in the equalization reservoir and thus the brake pipe so as to prepare the system for somewhat quicker application of the train brakes than would be possible from the release position. In the full service position, the brake equipment further reduces pressure within the equalization reservoir and correspondingly increases pressure within the brake cylinders so as to apply fully the train brakes. Moving the automatic brake handle into the suppression position does not further reduce pressure within the brake pipe but overrides certain safety and speed controls. In the continuous service position, the brake equipment reduces the equalization reservoir pressure to zero at a preset service rate of reduction. When the automatic brake handle is moved back into a service zone situated between the minimum and full service positions, the brake equipment generally holds pressure within the brake pipe at the existing pressure. In the emergency position, the brake equipment exhausts brake pipe pressure to atmosphere through two emergency magnet valves at an emergency rate so as to apply quickly and fully the train brakes.

Likewise, the independent brake handle may be moved in between and placed within any of two positions. When the independent brake handle is moved to the release position, the brake equipment reduces pressure within the IAR pipe and correspondingly reduces pressure in the brake cylinders of the locomotive so as to release completely the locomotive brakes. Likewise, when the independent brake handle is moved to the apply position, the brake equipment increases pressure within the IAR pipe and correspondingly increases pressure in the brake cylinders of the locomotive so as to apply fully the locomotive brakes. Pressure within the IAR pipe and the locomotive brake cylinders reduces and increases in relation to the position of the independent brake handle.

One significant disadvantage to nondiscrete brake control systems lies in their inability to release the train brakes quickly. When the automatic brake handle of a nondiscrete brake control system is moved into the apply position, the system depressurizes the equalization reservoir and the brake pipe so as to pressurize the brake cylinder and apply the train brakes. After the automatic brake handle is moved out of apply position, however, it takes time for the equalization reservoir and brake pipe to repressurize so as to depressurize the brake cylinders and release the train brakes. Consequently, trains equipped with such nondiscrete brake control systems must wait until the train brakes release; the length of the wait depending in part upon the length of the train. For passenger transit and other trains which must stop often to load and unload cargo or passengers, this constitutes a distinct disadvantage.

Certain brake control systems, such as the WABCO EPIC® CS-2 Brake Control System and like systems (hereinafter "discrete brake control systems"), in which the instant invention is to be used, are designed to overcome this disadvantage. They include cab control units/automatic brake handles that function significantly differently than those found in the nondiscrete brake control systems described above. In discrete brake control systems, the automatic brake handle can occupy any one of six discrete positions. Essentially, there is no continuum of braking power through movement of automatic brake handle as with the nondiscrete brake control system, but only discrete states. The six discrete positions are the release, hold, lap, apply, handle off and emergency positions. In the release position, the brake equipment commands the equalization reservoir and thus the brake pipe to pressurize fully and the brake cylinder to depressurize to zero psi thereby completely releasing the train brakes. In the hold position, the brake equipment commands the equalization reservoir and thus the brake pipe to pressurize fully but holds the brake cylinder pressure steady thereby maintaining brakes on the locomotive. In the lap position, the brake equipment commands the equalization reservoir and thus the brake pipe to hold pressure steady while the brake cylinder pressure also remains at whatever pressure the brake cylinder contained the moment the handle was placed into the lap position. In the apply position, the brake equipment commands the equalization reservoir and thus the brake pipe to depressurize at the service rate of reduction. The brake cylinder then pressurizes at a rate generally corresponding to the rate at which the brake pipe depressurizes so that the train brakes apply. Moving the handle from the apply position to the lap position halts the depressurization of the equalization reservoir and thus the brake pipe and maintains the brake cylinder pressure steady. To achieve a particular amount of braking power, the train operator moves the automatic brake handle to and from the apply and lap positions thereby alternately reducing and maintaining the pressure in the brake pipe until the train brakes are applied at a desired braking power as measured by a pressure gage. If the handle is kept in the apply position long enough, pressure within the equalization reservoir and thus the brake pipe will reduce to zero psi at the service rate. The brake equipment basically controls the equalization reservoir, the brake pipe and the brake cylinder in the handle off position in the same way it does in the apply position. In the emergency position, the brake equipment commands the equalization reservoir and thus the brake pipe to depressurize fully. Two emergency magnet valves open so as to vent pressure from the brake pipe at an emergency rate thereby enabling the train brakes to apply quickly and fully.

Generally used in passenger transit and other applications in which trains must stop often to load and unload cargo or passengers, the advantage of such discrete brake control systems lies in their ability to release quickly the train brakes. When the automatic brake handle of a discrete brake control system is moved into the apply position, the equalization reservoir and thus the brake pipe depressurize at the service rate of reduction. The brake cylinder then pressurizes at a rate generally corresponding to the rate at which the brake pipe depressurizes so that the train brakes apply. After the train is stopped, when the automatic brake handle is moved into the hold position, the brake cylinder pressure holds steady and the train brakes remain in the applied state. More significant is that the equalization reservoir and thus the brake pipe pressurize fully while, for example, passengers or cargo are being loaded or unloaded. With the automatic brake handle in the hold position, the discrete brake control system, unlike the nondiscrete brake control system, primes the equalization reservoir and the brake pipe for quick release of the train brakes. The train brakes may then be released quickly when the automatic handle is moved into the release position. When the train is ready to depart, the train brakes can be quickly released without the need to wait for the equalization reservoir and the brake pipe to repressurize. Trains equipped with discrete brake control systems are ideally suited for work environments which require constant stopping and starting.

Referring still to the elements of the typical locomotive, the keyboard generally includes several keys each of which is dedicated to one or more functions. In certain versions of WABCO EPIC® Brake Equipment, the keyboard includes seven keys for inputting certain parameters necessary to set-up the brake equipment for operation. For example, the train operator may select a feedvalve setting appropriate to the rail vehicles in the train consist. This feedvalve setting represents the maximum pressure to which the brake pipe may be charged by the brake equipment.

Through these keys, the train operator also selects the mode in which the brake equipment operates the train. In the LEAD CUT-IN mode, the brake equipment allows the train operator to direct control of the train through both the automatic and the independent brake handles. This gives the train operator control over the brakes of both the locomotive (s) and the rail vehicles. In the LEAD CUT-OUT mode, the brake equipment allows the train operator to direct control of the train only through the independent brake handle. This gives the train operator control over the brakes of the locomotive(s) only. In the TRAIL mode, both of the automatic and independent brake handles are rendered inoperable except for the emergency position. In a locomotive consist, the brake equipment of one locomotive operating in the TRAIL mode is subservient to the brake equipment of another locomotive operating in either of the LEAD modes. The brake equipment assumes the previous mode of operation at system start up, except for double-ended systems which default to TRAIL mode.

The cab control unit of the discrete brake control system converts analog electrical signals representing the positions of the automatic and independent brake handles into digital code and transmits such codes to the brake control unit for use in controlling the train brakes. Likewise, the cab control unit also transmits to the brake control unit signals indicative of the other operating parameters set forth above. The cab control unit continuously transmits such information to the brake control unit in a stream of signal packets (hereinafter "base signal stream") along a communications (hereinafter "comm") channel. Each signal packet generally consists of a series of bytes which collectively represent the various input parameters used to control the brake system. For example, in WABCO EPIC® Brake Equipment, the cab control unit sends to the brake control unit in a typical signal packet: four bytes representing the positions of the automatic (two bytes) and independent (two bytes) brake handles; two bytes representing the feedvalve setting; one byte representing the number of locomotives in the locomotive consist; and one or more status bytes. The status bytes include at least one bit for the emergency position of the automatic brake handle and various other bits representing various penalty inputs and other operating conditions.

The status bytes also include current mode bits and request mode bits. The current mode bits indicate the mode in which the cab control unit is set and in which the system is currently operating. Occupying the same position in the status bytes as the current mode bits, the request mode bits indicate a request for a change in the operating mode. While the brake equipment is operating in any given mode, the cab control unit sends to the brake control unit within each signal packet the current mode bits. When a change in mode is requested via the keyboard, the cab control unit transmits to the brake control unit within the signal packet the request mode bits. The brake control unit grants or denies such requests based on criteria set forth in the system software. Based on the signal packets received via the comm channel and on various other inputs, the brake control unit controls the operation of the brakes.

Referring still to the elements of the typical locomotive and the brake equipment therein, the brake control unit includes a brake CPU board and one or more brake I/O cards each interconnected to the brake CPU board via a standard port. Through the brake I/O cards, the brake CPU receives various inputs from, and transmits various outputs to, both the locomotive interface unit and the pneumatic operating unit as alluded to previously. The brake control unit receives, albeit somewhat indirectly, the signal packets from the cab control unit via the comm channel. In WABCO EPIC® Brake Equipment for example, the CPU boards of the brake and cab control units each contain at least one RS-232 or like communications port. In particular, a first comm port on the cab CPU board, a second comm port on the brake CPU board and a channel connected therebetween constitutes the comm channel. Before transmitting each signal packet to the brake control unit, the cab control unit takes approximately 100 ms to perform the necessary operations to create and send each signal packet. This includes scanning the handle positions, reading certain other input parameters, converting the analog signals to digital form and generating each signal packet. Similarly, through the brake CPU board and the brake I/O cards, the brake control unit takes approximately 70 ms to perform its operations during its standard control loop. This includes reading input from various pressure sensors such as a brake pipe sensor, an equalization reservoir sensor, and a brake cylinder sensor; decoding each signal packet received; and controlling various magnet valves such as a brake application magnet valve and a brake release magnet valve. Consequently, the total delay between movement of the brake handles and actual activation of the various valves that effect train brake response has been measured at about one (1) second. Given all the information that the cab control unit incorporates in each signal packet and the time it takes to do so, the typical prior art discrete brake control system responds noticeably sluggishly to movement of the automatic brake handle.

The instant invention significantly improves upon the response times typically associated with the discrete brake control systems set forth previously. Whereas discrete brake control systems equipped solely with the typical comm channel discussed above provide a response time of approximately one (1) second, discrete brake control systems having the instant communication scheme should exhibit response times of approximately 50 milliseconds or better. The instant communication scheme may be used either in lieu of or in combination with the typical comm channel with regard to the automatic brake handle. If used in conjunction with the typical comm channel, the instant communication scheme may be used as either a primary or a secondary means of communicating the position of the automatic brake handle to the brake control unit. Though conceived as a means for communicating directly the discrete positions of the automatic brake handle to the brake control unit, the present communication scheme may be used instead to so communicate the positions of the independent brake handle or both. However the instant invention is utilized, it should be apparent that it will substantially reduce the response time of whatever discrete brake control system into which it is incorporated.

Though the instant invention is presented in the following detailed description in the context of single ended locomotives, it should be apparent to persons skilled in the brake control system art that the present invention could also be used in discrete control systems designed to control double ended locomotives.

It should also be noted that the foregoing background information is provided to assist the reader in understanding the instant invention and any terms of art used herein are not intended to be limited to any specific meaning unless specifically stated otherwise in this specification including the following detailed description.

SUMMARY OF THE INVENTION

In a presently preferred embodiment, the present invention provides a system for electronically controlling brakes on a train wherein the system is responsive to a brake handle when placed into any one of a plurality of discrete positions. The instant electronic brake control system includes a cab station means, a brake control means, a comm channel and a direct communication means. The cab station means generates both a base signal stream and a dedicated signal stream. The base signal stream is indicative of parameters for operating the system including the discrete brake handle positions. The dedicated signal stream is solely indicative of the discrete brake handle positions. The brake control means controls operation of the brakes in coordinated response to both the base and the dedicated signal streams. The comm channel is the route through which the base signal stream is communicated from the cab station means to the brake control means. The direct communication means is in parallel with the comm channel and communicates the dedicated signal stream from the cab station means to the brake control means. Information pertaining to the discrete brake handle positions is communicated to the brake control means faster through the direct communication means than through the comm channel. This enables the brake control means to respond promptly to positioning of the brake handle.

In a second aspect, the present invention provides a direct communication package for use with a system for electronically controlling brakes on a train wherein the system is of a type that includes a handle unit, a cab control unit, a brake control unit and a comm channel. The handle unit generates an electrical signal representative of a plurality of discrete positions for a brake handle. The cab control unit generates a base signal stream indicative of parameters for operating the system including the discrete handle positions. The comm channel communicates the base signal stream from the cab control unit to the brake control unit which controls operation of the brakes in response thereto. The instant direct communication package includes: a first direct port on the cab control unit; a second direct port on the brake control unit; a first reprogramming means for use by the cab control unit; a conduit interconnecting the direct ports; and a second reprogramming means for use by the brake control unit. The first reprogramming means, in addition to generating the base signal stream and performing other functions, scans the handle unit such that the electrical signal is converted to a dedicated signal at a prespecified accelerated rate so as to form a dedicated signal stream. The conduit communicates the dedicated signal stream from the cab control unit to the brake control unit. The second reprogramming means, among other functions, scans the second direct port at a preset accelerated rate for the dedicated signal stream and controls operation of the brakes in coordinated response to both signal streams. Information pertaining to the discrete brake handle positions is communicated to the brake control unit faster through the direct communication package than through the comm channel thereby enabling the brake control unit to respond promptly to positioning of the brake handle.

OBJECTS OF THE INVENTION

It is, therefore, a primary object of the present invention to provide an electronic brake control system of a type that is responsive to a brake handle positionable into any one of a plurality of discrete positions such that the discrete brake control system responds more promptly than prior art discrete brake control systems to positioning of the brake handle into the discrete positions.

Another object of the present invention is to provide an electronic brake control system of a type that is responsive to a brake handle positionable into any one of a plurality of discrete positions such that the discrete brake control system provides both a primary and a secondary route for transmission of signals indicative of the discrete handle positions thereby rendering the present invention more reliable than prior art discrete brake control systems.

Still another object of the present invention is to provide a direct communication package for use with an electronic brake control system of a type that is responsive to a brake handle positionable into any one of a plurality of discrete positions wherein the direct communication package enables the electronic brake control system to respond more promptly to positioning of the brake handle into the discrete positions.

Yet another object of the present invention is to provide a direct communication package for use with an electronic brake control system of a type that is responsive to a brake handle positionable into any one of a plurality of discrete positions wherein the direct communication package provides another route for transmission of signals indicative of the discrete handle positions thereby creating a faster and more reliable discrete brake control system.

In addition to the objects and advantages of the present invention set forth above, various other objects and advantages of the instant invention will become more readily apparent to those persons who are skilled in the brake control system art from the detailed description of the invention, particularly, when such description is taken in conjunction with the attached drawings and with the appended claims.

DETAILED DESCRIPTION OF THE INVENTION

Figure 1:
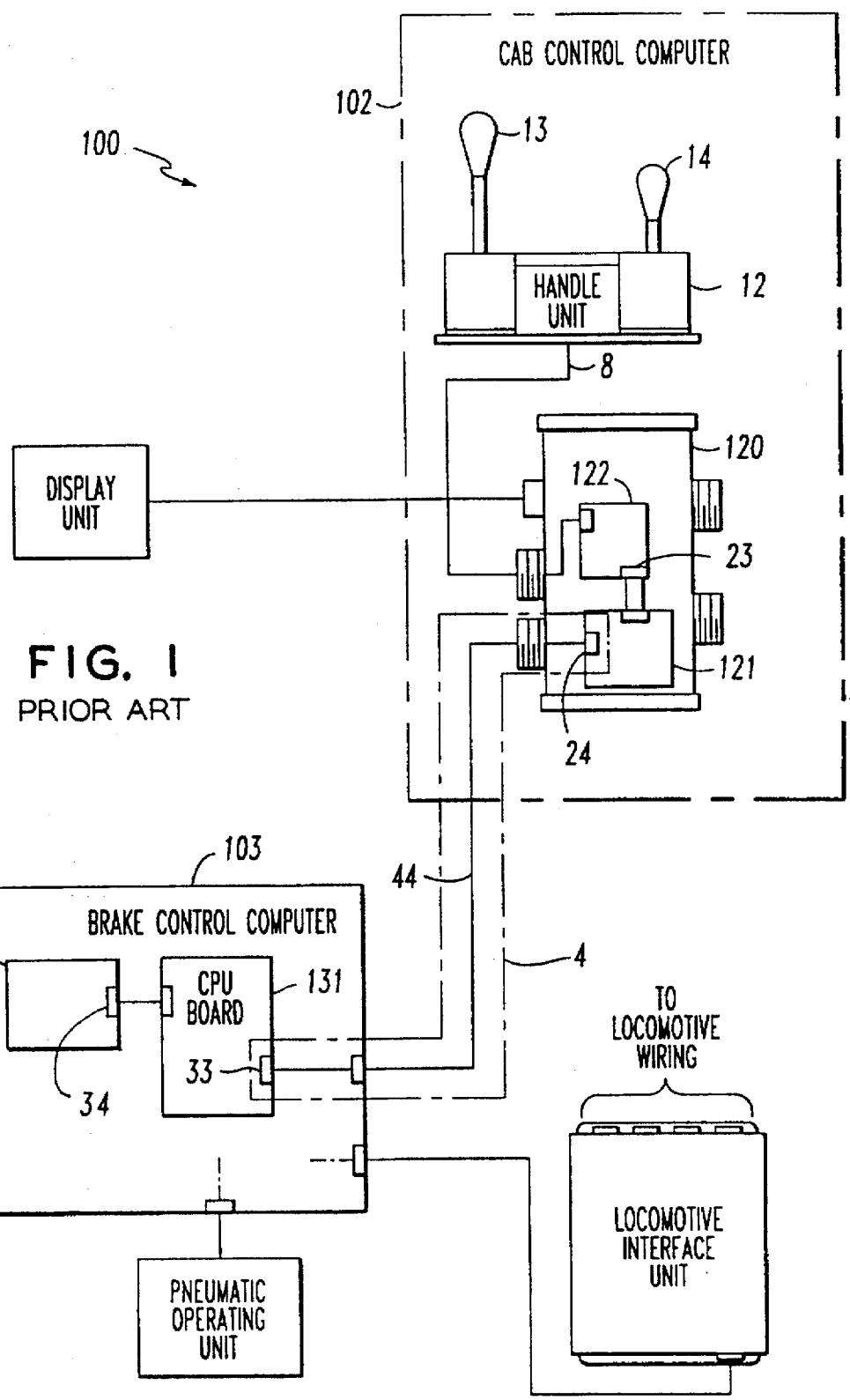
FIG. 1 is a schematic block diagram of a prior art discrete electronic brake control system.

Before presenting a more detailed description of various embodiments of the present invention, for the sake of clarity and understanding of the invention, the reader is advised that identical components having identical functions in each of the accompanying drawings have been marked with the same reference numerals throughout each of the several Figures illustrated herein.

Figure 2:
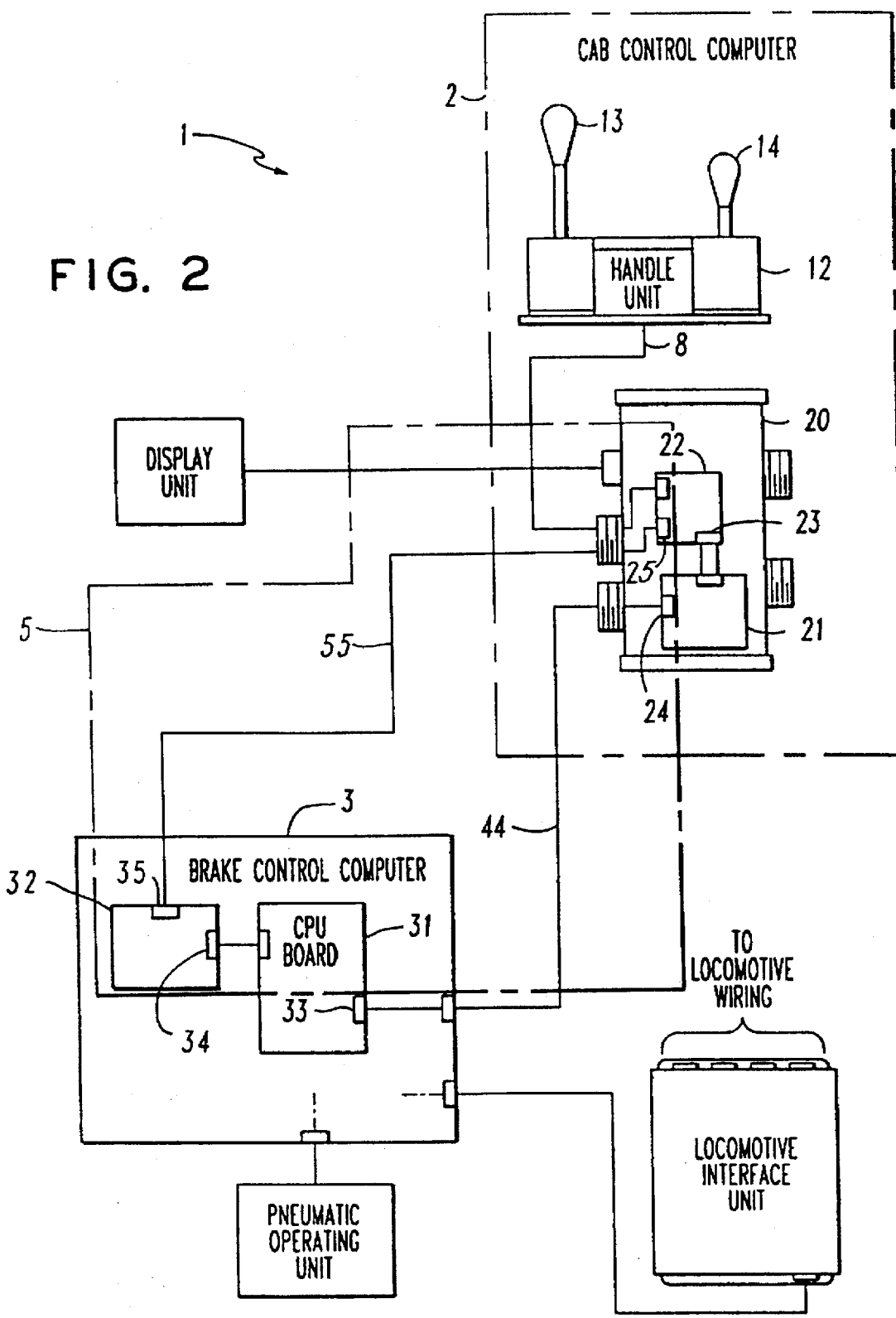
FIG. 2 is a schematic block diagram of the instant discrete electronic brake control system including a direct communication package in parallel relationship with a comm channel commonly found in prior art electronic brake control systems.

FIGS. 1 and 2 illustrate the essential details of the prior art electronic brake control system, generally designated 100, and the instant electronic brake control system, generally designated 1, respectively. Referring first to FIG. 1, the prior art brake control system 100, as generally previously, includes the cab station unit 102, the brake control unit 103 and the comm channel 4. The cab station unit 102 includes the handle unit 12 and the cab control unit 120. The handle unit 12 has an automatic brake handle 13 and an independent brake handle 14. The automatic brake handle 13 is of a type that is used in connection with the prior art discrete brake control systems as described above. Specifically, the prior art system 100 is responsive to the automatic brake handle 13 when it is positioned within any one of the six discrete positions. The six discrete positions (not shown) are the release, hold, lap, apply, handle off and emergency positions also as described above. Through movement of the automatic brake handle 13, the handle unit 12 generates an electrical signal representative of the discrete positions. The handle unit 12 similarly generates an electrical signal corresponding to the position of the independent brake handle 14.

The cab control unit 120 of FIG. 1 has the cab CPU board 121 including the first comm port 24 and the cab I/O card 122 including the base port 23. As generally explained previously, the prior art cab control unit 120 includes a cab programming means (not shown) which, among other functions, executes a standard control loop of approximately 100 milliseconds duration in which it performs the various operations necessary to create and send each signal packet. During this cab control loop, the cab I/O card 122 receives from the handle unit 12 through the cable 8 the electrical signals representing the positions of the automatic and independent brake handles 13,14 and converts them into digital code. The cab I/O card 122 sends the digital code via the base port 23 to the cab CPU board 121. The cab control unit 120 also receives and converts input signals representing other operating parameters (not shown) including the requests for LEAD CUT-IN, LEAD CUT-OUT and TRAIL mode of operation as set forth above. In each control loop, the cab CPU board 121 generates, from these converted input signals, one signal packet indicative of these operating parameters including the positions of the automatic and independent brake handles 13,14. Through the first comm port 24, the cab CPU board 121 communicates these signal packets, one for each control cycle, to the brake control unit 103 in the base signal stream.

Referring still to the prior art brake control system 100 illustrated in FIG. 1, the brake control unit 103 has the brake CPU board 131 including the second comm port 33 and the brake I/O card 132 including the standard port 34. From the first comm port 24 through channel 44 to the second comm port 33, the brake CPU board 131 receives the base signal stream. Through brake I/O card 132, various other inputs of system 100, previously set forth, are also conveyed to the brake CPU board 131. As generally explained previously, the prior art brake control unit 103 includes a brake programming means (not shown) which, among other functions, executes a standard control loop of approximately 70 milliseconds duration in which it performs the various operations necessary to control operation of the train brakes including decoding each signal packet received from the cab control unit 120 and acting thereon. A delay of approximately one (1) second has been measured between the time the automatic brake handle 13 is moved into any one of the discrete positions and the time that the brake control unit 103 actuates the various valves that effect the train brakes.

Figure 3:
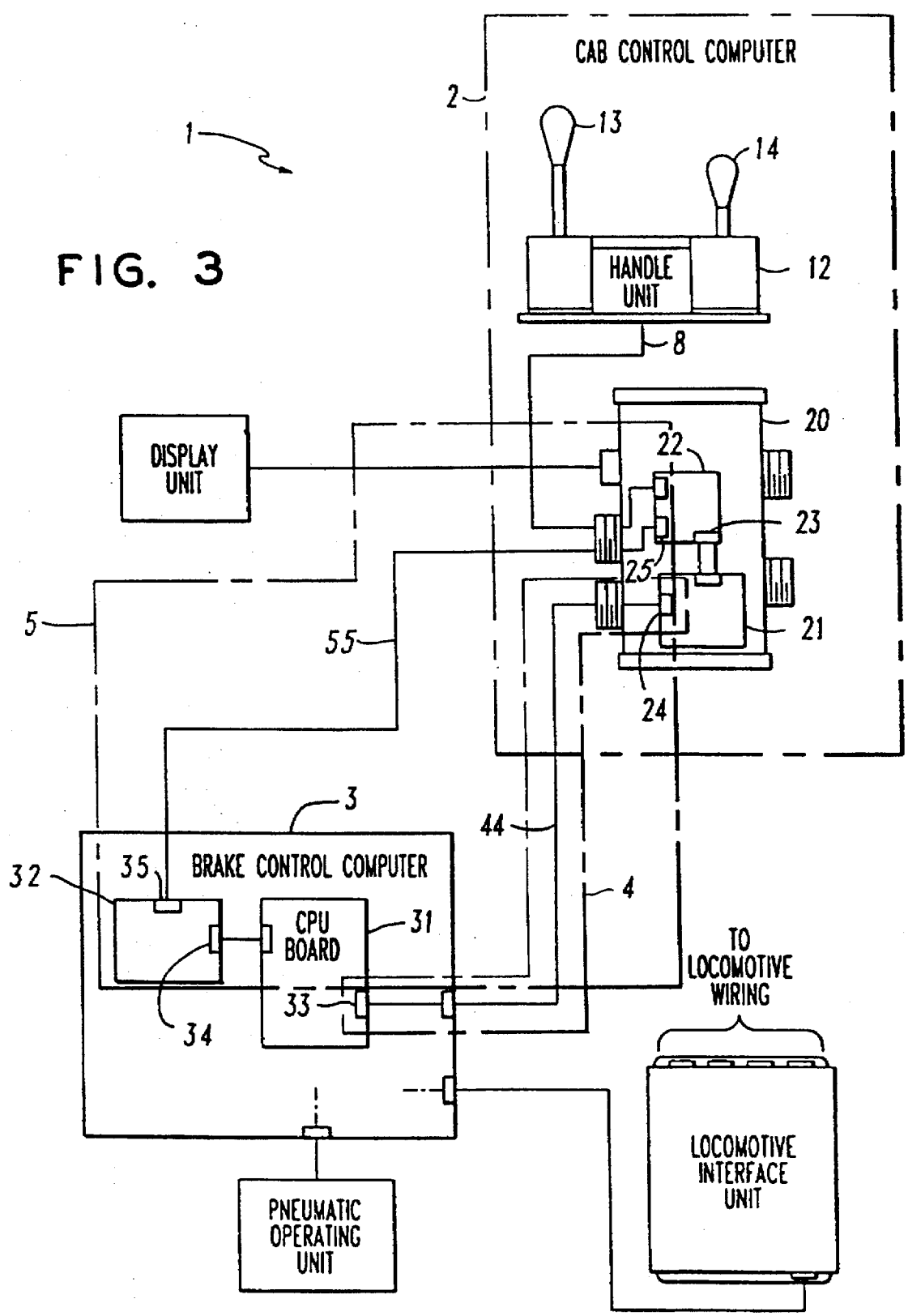
FIG. 3 is a slightly enlarged partial schematic block diagram of the instant electronic brake control system illustrated in FIG. 2 showing the essential details of the present invention including the direct communication package.

Referring now to FIGS. 2 and 3, the presently preferred embodiment of the instant brake control system 1 includes a cab station unit 2, a brake control unit 3, the comm channel 4 and a direct communication device 5. The cab station unit 2 includes the handle unit 12 and a cab control unit 20. Identical to the prior art discrete brake control system 100, the handle unit 12 includes the automatic brake handle 13 through which it generates an electrical signal representative of any one of the six discrete handle positions.

Figure 4:
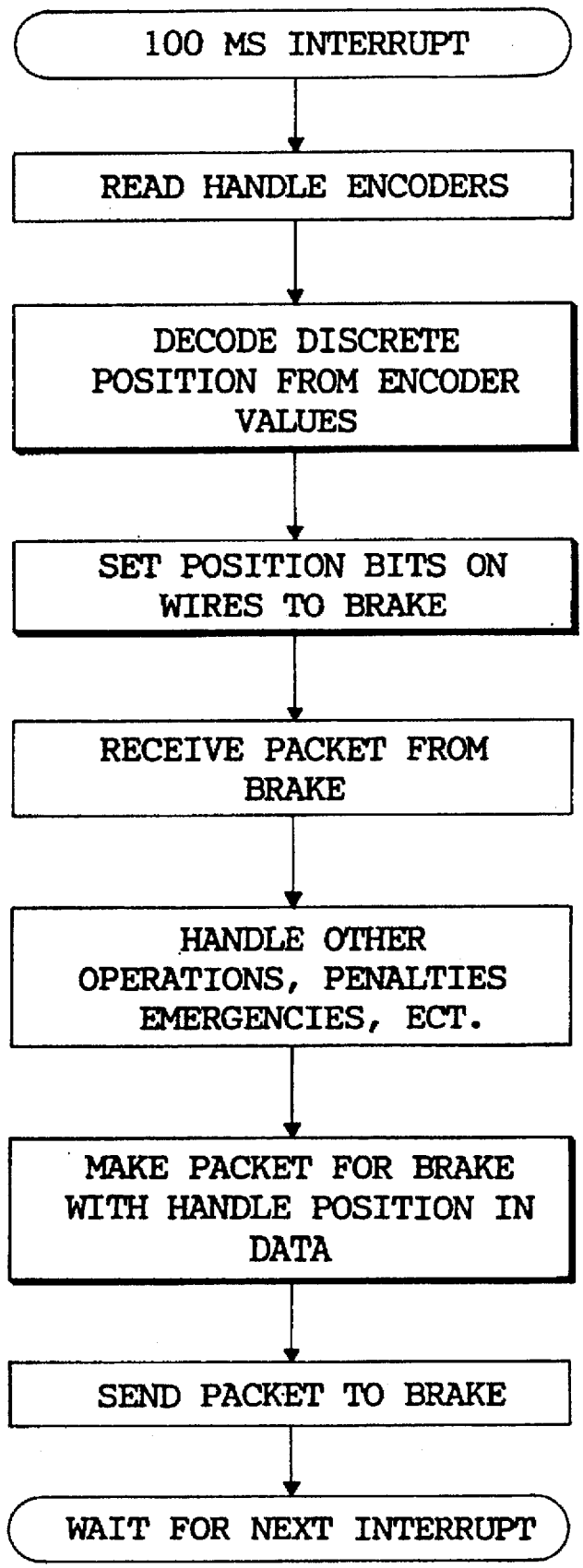
FIG. 4 is a flowchart diagram of the software routines for a cab control unit of the instant invention including routines modified or new to the instant invention represented by shaded blocks.

The cab control unit 20 of the instant invention is significantly different than that of the prior art discrete brake control system 100. First, though the cab control unit 20 also includes a cab I/O card 22, the cab I/O card 22 further includes a first direct port 25 in addition to the base port 23. Second, though the cab control unit 20 also includes a cab CPU board 21 containing the first comm port 24, the cab control unit 20 includes a cab reprogramming means (not shown) instead of the prior art cab programming means. Similar to the cab programming means and as flowcharted in FIG. 4, the cab reprogramming means, among other functions, executes through the cab control unit 20 the standard 100 ms cab control loop in which it performs the various operations necessary to create and send each signal packet. During this cab control loop, the cab I/O card 22 receives from the handle unit 12 through the cable 8 the electrical signals representing the positions of the automatic and independent brake handles 13,14 and converts them into digital code. The cab I/O card 22 sends the digital code via the base port 23 to the cab CPU board 21. Identical to the prior art system, the cab control unit 20 also receives and converts input signals representing other operating parameters including the requests for LEAD CUT-IN, LEAD CUT-OUT and TRAIL mode of operation as set forth above. In each control loop, the cab CPU board 21 generates, from these converted input signals, one signal packet indicative of these operating parameters including the positions of the automatic and independent brake handles 13,14. Through the first comm port 24, the cab CPU board 21 communicates these signal packets, one for each control cycle, to the brake CPU board 31 in the base signal stream.

Unique to the instant brake control system 1, the cab control unit 20 also generates a dedicated signal stream representative solely of the discrete positions of the automatic brake handle 13. Newly implemented through the cab reprogramming means and as represented in the shaded blocks of FIG. 4, the cab control unit 20 continuously executes a scan loop. The cab control unit 20 scans the handle unit 12 at a prespecified accelerated rate for the electrical signal representing the discrete positions of the automatic brake handle 13 and generates therefrom a dedicated binary signal for each scan loop. After each scan loop, the cab control unit 20 places the dedicated binary signal on the first direct port 25 for communication to the brake control unit 3. Through the first direct port 25, the cab CPU board 21 via the cab I/O card 22 communicates these dedicated binary signals, one for each scan cycle, to the brake I/O card 32 in the dedicated signal stream. Consequently, through each dedicated binary signal of the dedicated signal stream and each signal packet of the base signal stream, the cab control unit 20 of the instant invention provides to the brake control unit 3, through two routes, information pertaining to the discrete positions of the automatic brake handle 13.

The brake control unit 3 of the instant invention is also significantly different than that of the prior art discrete brake control system 100. First, though the brake control unit 3 also includes a brake I/O card 32, the brake I/O card 32 further includes a second direct port 35 in addition to the standard port 34. Second, though the brake control unit 3 also includes a brake CPU board 31 containing the second comm port 33, the brake control unit 3 includes a brake reprogramming means (not shown) instead of the prior art brake programming means.

Figure 5A:
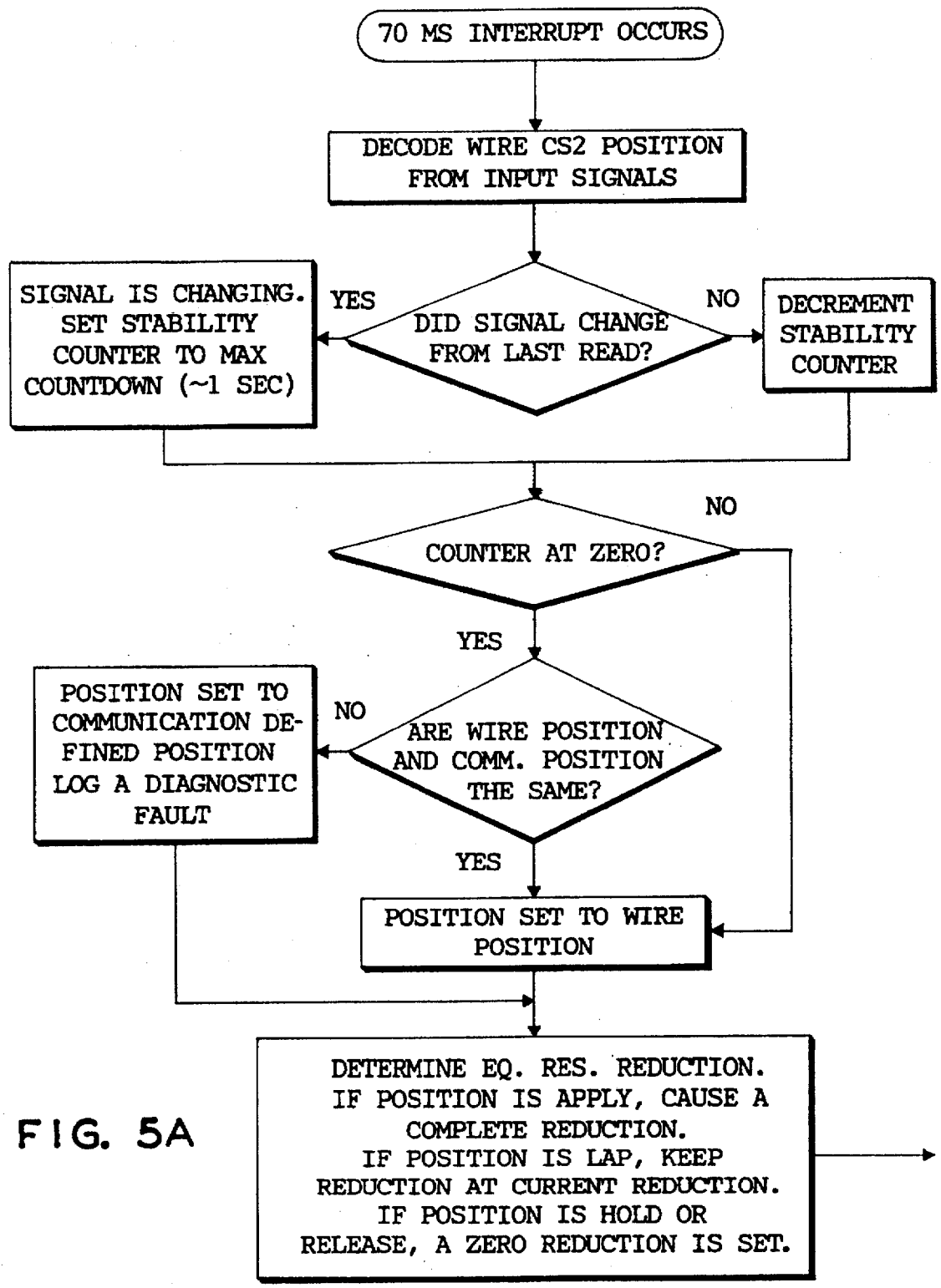
FIG. 5A is a partial flowchart diagram of the software routines for a brake control unit of the instant invention including routines modified or new to the instant invention represented by shaded blocks.
Figure 5B:
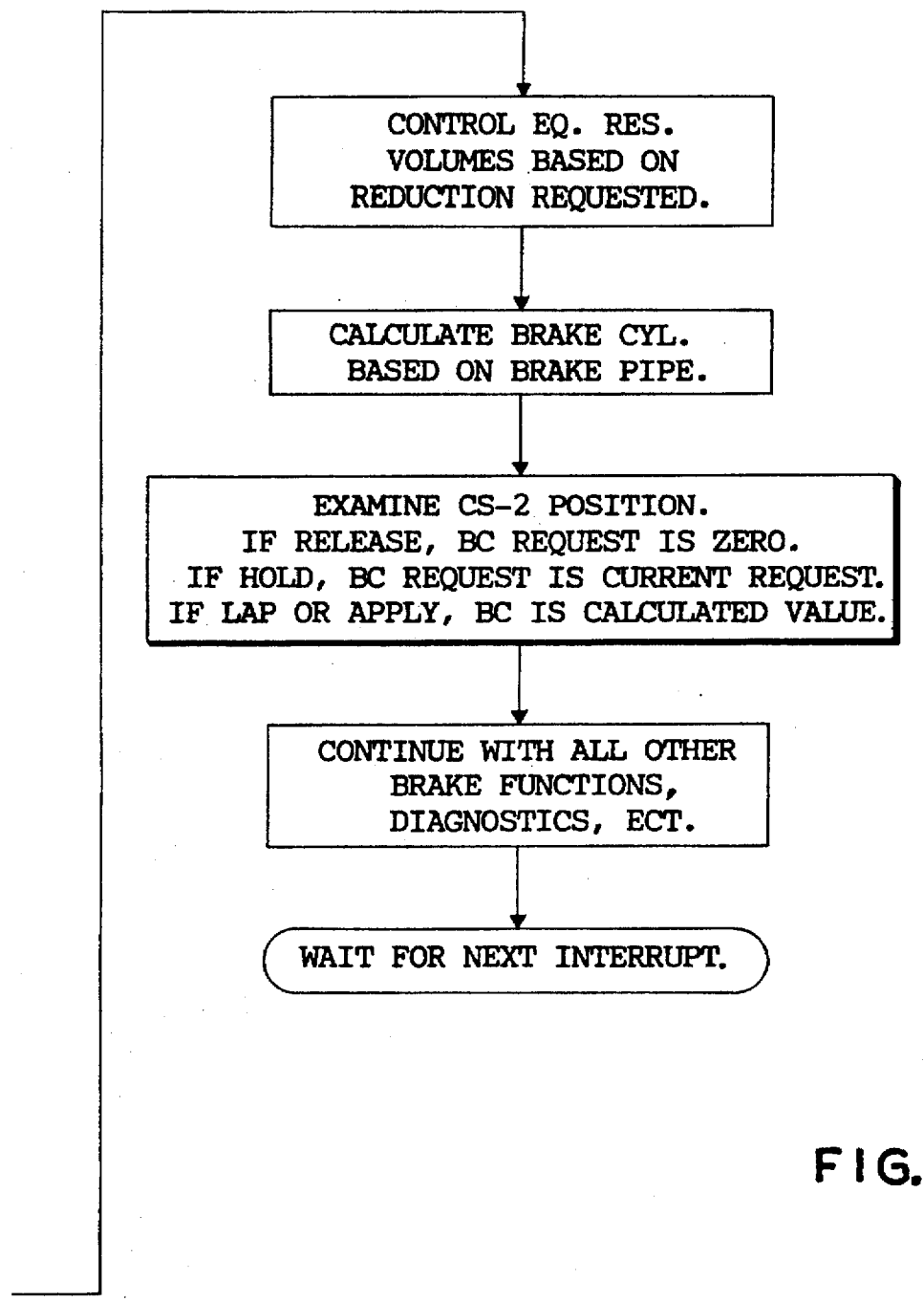
FIG. 5B is a continuation of the flowchart diagram of FIG. 5A.
Figure 5C:
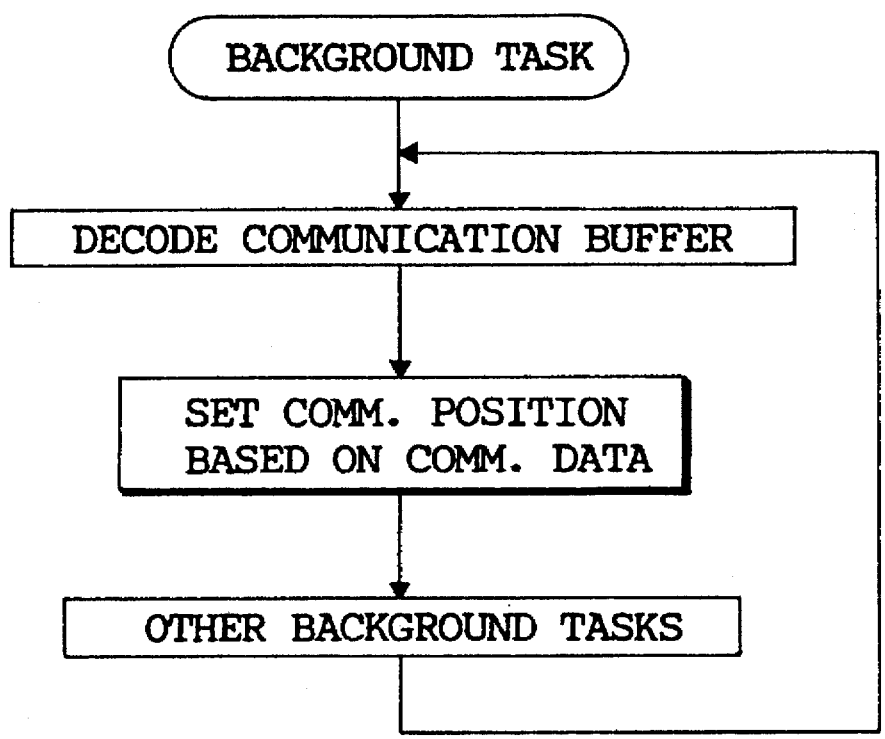
FIG. 5C is a continuation of the flowchart diagrams of FIGS. 5A and 5B.

Unique to the instant brake control system 1 and newly implemented through the brake reprogramming means, the brake control unit 3 also continuously executes a scan loop. Connected to the first direct port 25 through a conduit 55, the brake control unit 3 scans the second direct port 35 of the brake I/O card 32 at a preset accelerated rate for the dedicated signal stream and the dedicated binary signals therein. Similar to the brake programming means and as flowcharted in FIGS. 5A–C, the brake reprogramming means, among other functions, still executes through the brake control unit 3 the standard 70 ms brake control loop in which it performs the various operations necessary to control operation of the train brakes. Unlike the prior art, however, the brake control unit 3 through the brake reprogramming means controls operation of the train brakes in coordinated response to both the base and the dedicated signal streams.

The brake control unit 3 thus receives from the cab control unit 20 through two routes the information pertaining to the discrete positions of the automatic brake handle 13. The preexisting comm channel 4 is one such route and includes the first comm port 24, the second comm port 33 and the channel 44 connected therebetween. The direct communication device 5 is the other such route and includes the first direct port 25, the second direct port 35 and the conduit 55 connected therebetween. Through the brake reprogramming means flowcharted in FIGS. 5A–C, the brake control unit 3 coordinates its response to both the base and the dedicated signal streams by using, by default, the direct communication device 5 as a primary route and the comm channel 4 as a secondary route through which to receive the information. The brake control unit 3 also checks the information contained within each dedicated binary signal against that contained within each signal packet. If the information within the dedicated binary signal fails to match the information within the signal packet, the brake control unit 3 uses the comm channel 4 rather than the direct communication device 5 as the primary route through which to receive the information pertaining to the discrete positions of the automatic brake handle 13.

It should be noted that the signal packets are treated as if they contain valid information because the signal packets in the base signal stream undergo CRC checking (Cyclic Redundancy Checking) or like verification testing between the cab control unit 20 and the brake control unit 3. Furthermore, if the information within the dedicated binary signal fails to match the information within the signal packet in any given data check, the instant system 1 issues a diagnostic code. As with other diagnostic codes, this data error code is retrievable from a display.

The direct communication means 5 and the comm channel 4 thus communicate the information in parallel to the brake control unit 3 along the primary and secondary routes. For every cab scan loop, the cab control unit 20 makes one dedicated binary signal available at the second direct port 35 of the brake I/O card 32. For every 100 ms cab control loop, the cab control unit 20 makes one signal packet available at the second comm port 33 of the brake CPU board 31. By judicious selection of the prespecified scanning rate, the cab control unit 20 makes one dedicated binary signal available to the brake control unit 3 more often than it makes one signal packet available. In other words, the information pertaining to the discrete positions of the automatic brake handle 13 is communicated to the brake control unit 3 faster through the direct communication means 5 than through the comm channel 4. This enables the instant brake control system 1 to respond to the positioning of the automatic brake handle 13 more promptly than does the prior art system 100. Appropriate selection of the preset scanning rate of the brake control unit 3 also affects the speed at which the instant brake control system 1 responds to the positioning of the automatic brake handle 13.

Given the duration of the standard 100 ms cab control loop, the prespecified rate at which the cab control unit 20 scans the handle unit 12 may be selected from within the range of approximately 10 to 100 milliseconds. Preferably, the prespecified rate should be significantly less than 100 ms (e.g., 50 ms) to achieve a noticeable improvement in the speed at which the instant system 1 responds to positioning of the automatic brake handle 13. Likewise, the preset rate at which the brake control unit 3 scans the second direct port 35 for the dedicated signal stream may be selected from within the range of 8 to 70 milliseconds (e.g., 35 ms). It should be noted, however, that though brake CPU board 31 receives each dedicated signal as often as the prespecified and preset rates allow, it acts on the information contained therein during the standard 70 ms brake control loop. Consequently, any decrease in the standard brake control loop duration would also improve the response of the instant system 1 to positioning of the automatic brake handle 13. Notwithstanding a quicker brake control loop, the instant system 1 with the direct communication means 5 should yield response times as low as approximately 50 ms or even better. This is a substantial improvement over the prior art brake control system 100 which, equipped solely with the comm channel 4, provides a response time of approximately one (1) second.

It should be apparent to persons skilled in the brake control system art that the conduit 55 through which the dedicated signal stream flows consists of a number of wires corresponding to the number of bits in each of the dedicated binary signals. The number of bits and thus the number of wires depends upon the number of discrete automatic brake handle positions to be communicated to the brake control unit 3. As the instant system is designed for use with an automatic brake handle of the type typically associated with the prior art discrete brake control systems heretofore described, there are six discrete handle positions to consider, namely, the release, hold, lap, apply, handle off and emergency positions. The apply, handle off and emergency positions may be combined, however, because the brake control unit 3 commands the brake pipe to depressurize (and the train brakes to apply) when the automatic brake handle is positioned into any one of these three positions. Thus, as far as the instant system 1 is concerned, there are four discrete positions to be communicated to the brake control unit 3 via the direct communication device 5.

Each dedicated binary signal therefore need only contain two bits, and thus two wires are needed within the conduit 55 to communicate the dedicated signal stream from the first direct port 25 to the second direct port 35. Each of the direct ports 25,35 is an RS-232 or like communications port. Only two pins, however, are needed to communicate the two bit dedicated binary signals. For example, when the automatic brake handle 13 is moved into the release position, the two bit binary code 00 may be sent as the dedicated binary signal to the brake control unit 3. When the automatic brake handle 13 is positioned into the hold position, the dedicated binary signal may be 01. Likewise, the dedicated binary signal may be 10 for the lap position and 11 for the apply, handle off and emergency positions. Note, however, that if the instant system 1 were to be adapted to a double ended locomotive rather than the single ended locomotive contemplated herein, four wires would be required within conduit 55, two wires from each cab control unit.

A direct communication package is now set forth to enable such skilled persons to modify substantially the prior art discrete brake control system described previously so as to form the equivalent of the instant system 1. Referring alternately to FIGS. 1 and 2, the direct communication package 5 includes a replacement cab I/O card 22 having the first direct port 25, a replacement brake I/O card 32 having the second direct port 35, the cab reprogramming means for use by the cab control unit 120, the brake reprogramming means for use by the brake control unit 103, and the conduit 55 interconnecting the direct ports 25,35 through which the dedicated signal stream is communicated from the cab control unit 120 to the brake control unit 103. The replacement cab I/O card 22 is to be used instead of the cab I/O card 122 and includes the first direct port 25 thereon in addition to the base port 23. The replacement brake I/O card 32 is to be used instead of the brake I/O card 132 and includes the second direct port 35 thereon in addition to the standard port 34. The replacement I/O cards 22,32 are nearly identical to the prior art I/O cards 122,132 except for the addition of the direct ports 25,35. The cab and brake reprogramming means as flowcharted in FIGS. 4 and 5A–C are likewise identical to those set forth previously in connection with the instant brake control system 1 of FIGS. 1 through 3 and would take the form of replacement EEPROMS or similar electronic storage devices. In all pertinent respects, the prior art discrete brake control system equipped with the direct communication package 5 would operate in a manner equivalent to the instant system 1 set forth above.

While the presently preferred embodiment and related aspects for carrying out the instant invention have been set forth in detail according to the Patent Act, those persons skilled in the brake control system art to which this invention pertains will recognize various alternative ways of practicing the invention without departing from the spirit and scope of the appended claims.

We claim:

1. A system for electronically controlling brakes on a train wherein said system is responsive to a brake handle when placed into any one of a plurality of discrete positions, said system comprising:
   (a) a cab station means for generating, according to a cab reprogramming means both a base signal stream formed at a standard cab rate and a dedicated signal stream formed at a prespecified accelerated rate, said base signal stream indicative of parameters for operating said system including said positions of said brake handle and said dedicated signal stream indicative of said positions of said brake handle;
   (b) a brake control means for controlling, according to a brake reprogramming means operation of such brakes in coordinated response to both said base and said dedicated signal streams such that said brake control means acts upon said base signal stream according to a standard brake rate and upon said dedicated signal stream according to a preset accelerated rate;
   (c) a comm channel through which said base signal stream is communicated from said cab station means to said brake control means; and
   (d) a direct communication means for communicating said dedicated signal stream from said cab station means to said brake control means and in parallel with said comm channel thereby allowing information pertaining to said brake handle positions to be communicated to said brake control means faster through said direct communication means than through said comm channel and enabling said brake control means to respond promptly via said dedicated signal stream to positioning of said brake handle, wherein:
      (a) said brake control means uses by default said direct communication means as a primary route and said comm channel as a secondary route through which to receive said information pertaining to said brake handle positions, and
      (b) said brake control means checks said information contained within said dedicated signal stream against that contained within said base signal stream such that if said information within said dedicated signal stream fails to match said information within said base signal stream, said brake control means uses said comm channel as said primary route through which to receive said information pertaining to said brake handle positions.

2. The system for electronically controlling brakes on a train as recited in claim 1 wherein:
   (a) said cab station means includes a handle unit and a cab control unit wherein
      (i) said handle unit has said brake handle through which an electrical signal representing said positions of said brake handle is generated, and
      (ii) said cab control unit has a cab CPU board and a cab I/O card, said cab I/O card for converting said electrical signal and for supplying said converted signal to said cab CPU board so that said cab CPU board generates said base signal stream in part therefrom according to said standard cab rate;
   (b) said brake control means includes a brake CPU board and a brake I/O card which are interconnected;
   (c) said comm channel includes a first comm port on said cab CPU board, a second comm port on said brake CPU board and a channel connected therebetween through which said base signal stream is communicated according to said standard cab rate from said cab control unit to said brake control unit; and
   (d) said direct communication means includes a first direct port on said cab I/O card, a second direct port on said brake I/O card and a conduit connected therebetween through which said dedicated signal stream is communicated according to said prespecified accelerated rate from said cab I/O card to said brake I/O card for communication to said brake CPU board which so controls operation of such brakes.

3. The system for electronically controlling brakes on a train as recited in claim 2 wherein:
   (a) said dedicated signal stream consists of a stream of binary words each of which containing a predetermined number of bits whose quantity depends upon a number of said positions preselected to be communicated to said brake control means; and
   (b) said conduit includes said predetermined number of wires each of which for communicating one of said bits of each of said binary words of said dedicated signal stream to said brake control means.

4. The system for electronically controlling brakes on a train as recited in claim 1 wherein said brake handle is at least one of an automatic brake handle and an independent brake handle.

5. An improved system for electronically controlling brakes on a train of a type that is responsive to a brake handle when placed into any one of a plurality of discrete positions and of a type that includes: (i) a cab station means for generating a base signal stream indicative of parameters for operating such system including such positions of such brake handle; (ii) a brake control means for controlling operation of such brakes in response to such base signal stream according to a standard brake rate; and (iii) a comm channel through which such base signal stream is communicated according to a standard cab rate from such cab station means to such brake control means, wherein the improvement comprises:
   (a) a first reprogramming means disposed within such cab station means through which such cab station means for also generating according to a prespecified accelerated rate a dedicated signal stream indicative of such positions of such brake handle;
   (b) a direct communication means for communicating said dedicated signal stream from such cab station means to such brake control means and in parallel with such comm channel thereby allowing information pertaining to such brake handle positions to be communicated to such brake control means faster through said direct communication means than through such comm channel; and (c) a second reprogramming means disposed within such brake control means through which such brake control means for controlling operation of such brakes in coordinated response to both such base and said dedicated signal streams such that said brake control means acts upon such base signal stream according to such standard brake rate and upon said dedicated signal stream according to a preset accelerated rate; thereby enabling such brake control means to respond promptly via said dedicated signal stream to positioning of such brake handle, wherein;

(ii)(1) said brake control means uses by default said direct communication means as a primary route and said comm channel as a secondary route through which to receive said information pertaining to said brake handle positions, and (ii)(2) said brake control means checks said information contained within said dedicated signal stream against that contained within said base signal stream such that if said information within said dedicated signal stream fails to match said information within said base signal stream, said brake control means uses said comm channel as said primary route through which to receive said information pertaining to said brake handle positions.

6. The improved system for electronically controlling brakes on a train as recited in claim 5 wherein:

(a) such cab station means includes a handle unit and a cab control unit wherein (i) such handle unit has such brake handle through which an electrical signal representing such positions of such brake handle is generated, and (ii) such cab control unit has a cab CPU board and a cab I/O card, such cab I/O card for converting such electrical signal and for supplying such converted signal to such cab CPU board so that such cab CPU board generates such base signal stream in part therefrom according to such standard cab rate;

(b) such brake control means includes a brake CPU board and a brake I/O card which are interconnected;

(c) such comm channel includes a first comm port on such cab CPU board, a second comm port on such brake CPU board and a channel connected therebetween through which such base signal stream is communicated according to such standard cab rate from such cab control unit to such brake control unit; and (d) said direct communication means includes a first direct port on such cab I/O card, a second direct port on such brake I/O card and a conduit connected therebetween through which said dedicated signal stream is communicated according to said prespecified accelerated rate from such cab I/O card to such brake I/O card for communication to such brake CPU board which so controls operation of such brakes.

7. The improved system for electronically controlling brakes on a train as recited in claim 6 wherein:

(a) said dedicated signal stream consists of a stream of binary words each of which containing a predetermined number of bits whose quantity depends upon a number of such positions preselected to be communicated to such brake control means; and (b) said conduit includes said predetermined number of wires each of which for communicating one of said bits of each of said binary words of said dedicated signal stream to such brake control means.

8. The improved system for electronically controlling brakes on a train as recited in claim 5 wherein such brake handle is at least one of an automatic brake handle and an independent brake handle.

* * * * *